(No Model.) 2 Sheets—Sheet 1.
W. W. BEAUMONT.
APPARATUS FOR VARYING THE VELOCITIES OF ROTATING MECHANISM.
No. 377,598. Patented Feb. 7, 1888.
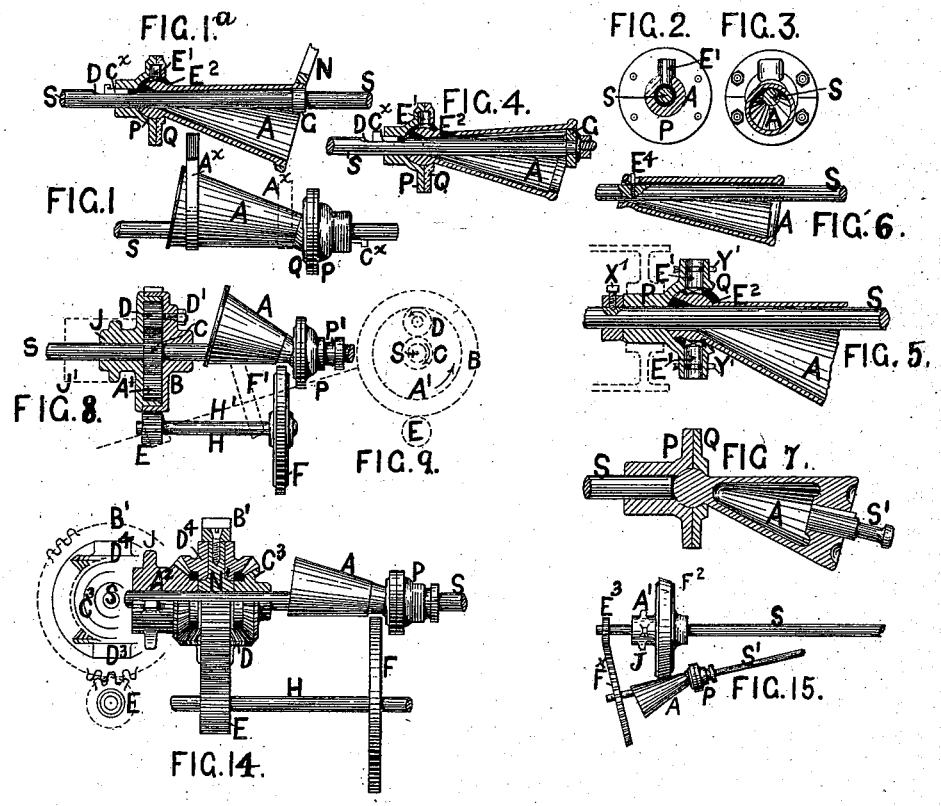

(No Model.) 2 Sheets—Sheet 2.
W. W. BEAUMONT.
APPARATUS FOR VARYING THE VELOCITIES OF ROTATING MECHANISM.
No. 377,598. Patented Feb. 7, 1888.
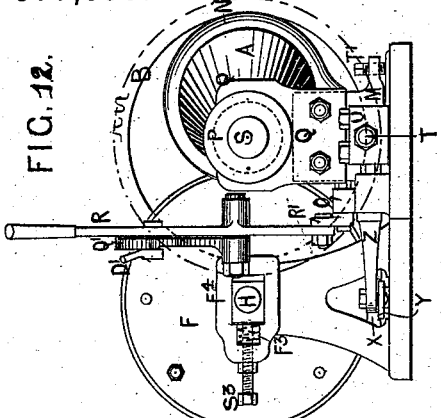
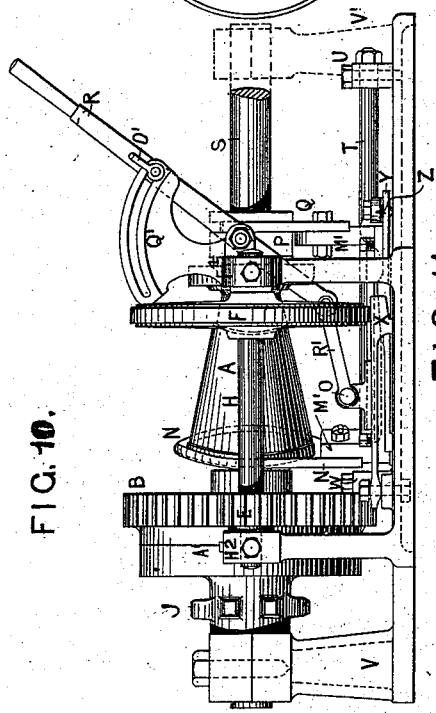
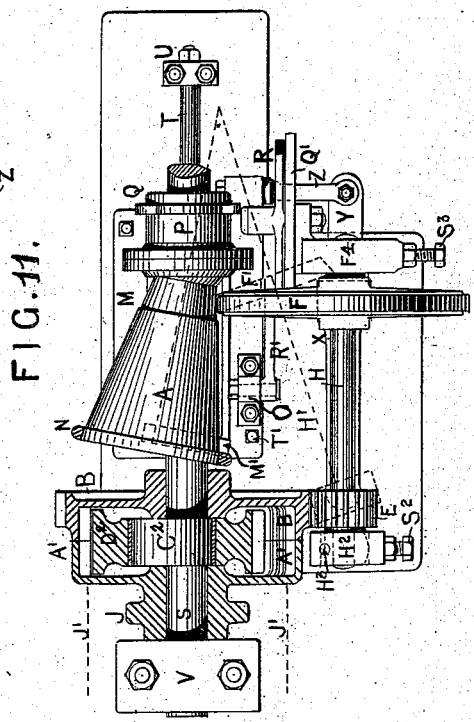
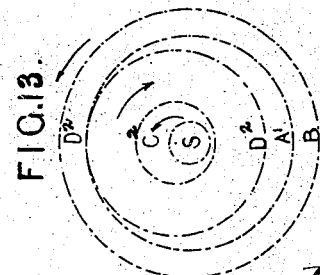
Attest:
W. E. Poulter
C. M. Gallaher
Inventor
William W. Beaumont,
per Henry Orth
his atty
N. PETERS, Photo-Lithographer, Washington, D. C.

UNITED STATES PATENT OFFICE.

WILLIAM WORBY BEAUMONT, OF HERNE HILL, COUNTY OF SURREY, ENGLAND.

APPARATUS FOR VARYING THE VELOCITIES OF ROTATING MECHANISM.

SPECIFICATION forming part of Letters Patent No. 377,598, dated February 7, 1888.

Application filed May 5, 1887. Serial No. 237,193. (No model.) Patented in England April 27, 1886, No. 5,736.

*To all whom it may concern:*

Be it known that I, WILLIAM WORBY BEAUMONT, a subject of the Queen of Great Britain, and a resident of Herne Hill, in the county of Surrey, England, engineer, have invented a new and useful Apparatus for Varying the Velocities of Rotating Mechanism, (for which Letters Patent have been granted in Great Britain under date of April 27, 1887, No. 5,736,) of which the following is a specification, reference being had to the accompanying drawings.

My invention relates to apparatus for varying the velocity of rotative movement, and it comprises new mechanical arrangements of cones whereby in combination with driving-straps, wheels, gearing, or other parts I am enabled to vary the speed or velocity of driven or, in some cases, of driving revolving shafts, spindles, wheels, or other parts of machinery or apparatus, the velocity being in some cases variable between zero and any chosen limit of velocity, and in some cases between zero and any chosen velocity of rotation in the one or the other direction, the cones being so mounted that one part of their surface is parallel or approximately parallel with the shafts or spindles upon or with which they revolve.

My invention is illustrated by the several drawings accompanying this specification.

In the drawings, Figure 1 is an elevation, and Fig. 1$^a$ a part sectional elevation, showing the invention applied to transmission by belt. Figs. 2 and 3 are cross-sectional views of same, indicating also one mode of attaching the cone to its spindle. Fig. 4 shows one mode of supporting the larger end of a cone upon the end of a spindle. Fig. 5 is a separate view of the spherical joint, with a means of attaching the cone to its spindle, and it indicates, also, by dotted lines the use of the boss or exterior part of the attachment-joint as a pulley or drum or means of conveying rotative motion. Fig. 6 shows another means of attaching the cone to the spindle. Fig. 7 shows another mode of mounting the cone—viz., through the medium of a spherical joint and with a spindle in the axis of the cone to provide a bearing for the large end of the cone when the shaft upon or with which the cone rotates is not carried through the cone. Fig. 8 shows the cone as employed for controlling or varying the velocity of epicyclic rotating mechanism of which it forms a part, the purpose of the mechanism being to transmit at a lower and variable velocity the power from a motive source or from a motor of higher velocity. Fig. 9 indicates the pitch lines of the gearing in Fig. 8 and their directions of rotation. Figs. 10, 11, and 12 are side elevation, plan partly in section, and an end view of an arrangement of the cone and mechanism shown in an elementary form in Figs. 8 and 9. Fig. 13 is an end view diagram to illustrate the wheel-gearing or the pitch lines of the gearing shown in Fig. 11. Fig. 14 shows the cone as employed with epicyclic gearing of the form, though not necessarily for the purpose, of that known as "Jack-in-the-box" or as "Houldsworth's" differential or equational gear or compensating gear. Fig. 15 is a diagram indicating a modification of the variable-velocity gears illustrated by Figs. 8 to 14.

Referring to Figs. 1, 1$^a$, 2, and 3, A is a hollow cone mounted upon and eccentrically to a shaft, S, by means of a spherical or ball-and-socket joint. When two cones are used for transmission by means of belts, they are placed with the large end of one opposite the small end of the other, as shown, and the advantage of these cones is that the belt $A^x$ runs upon them very much as it does upon two cylindrical drums or pulleys, while a variation of speed is obtained by moving the belt to any position along the cones. The inner part of the joint, the ball, is formed with or as part of the cone A, as shown, and is free to move in the socket of a hollow box made in three parts, one-half part, P, being formed with a boss for attachment either loosely or fixed by a key, $C^x$, upon the shaft S, upon which the cone is placed. The other half part Q (see Fig. 3) is made in two pieces, like a ring divided diametrically, and is fixed to the part P, Figs. 1 and 2, by bolts or screws. When it is necessary to be able to move the cone longitudinally backward and forward upon the spindle S, a feather or pin must be fixed in the boss of the part P, and the keyway D must be made of the necessary length to allow the cone and joint to be moved as desired. In some cases and as here shown the cone is used in such a way that the part P is fixed to the spindle and longitudinal movement is effected by moving the spindle itself in the direction of its length. Within the parts of the ball-joint provision is made for the insertion of the key E'. (See Figs. 1ᵃ and 2.) The body of this key is cylindrical; but at one end it is flattened, as particularly seen in Fig. 2, so that it may enter the slot E² made in the ball at the end of the cone. By means of this key E' motion is either conveyed by the cone to the part P or by the part P to the cone, according as the cone is driver or driven. The key E' may be quite inclosed, as shown at Fig. 1, or it and the hole containing it may be made to reach the circumference of P Q, as seen at Fig. 5, which is to be presently described, and the key E' may be held in its place by a pin, Y', or by a screw-pin passing or projecting into a groove turned in the cylindrical part of the key. In any case the key E' must be free to move in partial rotation to suit the movement of the ball within the socket. Two keys, E', may be used, as seen at Fig. 5, or four, if necessary. The surface of the larger end of the cone has a velocity greater than that of the smaller end in proportion to the difference in diameters, so that although one part of the cone remains parallel to the spindle S, upon or with which it revolves, it is necessary when a spindle passes through the cone to provide for the difference between the velocity of the inner part of the cone at the larger end and that of the spindle. In some cases this may be sufficiently provided for by a roller, G, as shown in Fig. 1ᵃ, or in the modification, Fig. 4, in which latter case, the cone being at the end of the spindle, the roller G is shown as running upon the reduced end of the spindle and kept in place by a collar or washer and nut. The roller G in Fig. 1ᵃ might be allowed to run upon the spindle and kept in place by a small inserted pin running in a groove in the spindle, or collars might be fixed on either side of it. Generally a collar on the outside would be sufficient, as the tendency of a small collar-roller, like G, would be to move away from the cone.

For some purposes a fixed collar at G answers the requirements, the collar and inside of the cone being lubricated, so that the inner surface of the cone slides over the collar, and lubrication would be easy, because the tendency of the lubricant would always be to seek the larger end of the cone. In some cases the end of the cone is supported by a bearing which encircles it, as shown in section at N, Fig. 1ᵃ.

In some applications the boss of the part P of the spherical joint may be required to receive a drum, as indicated by dotted lines at Fig. 5, and the drum may either give motion to the cone or the cone may give motion to it, and the part P may be fixed to the spindle S or rotate upon it, and a collar with set-screw X' may be employed to keep it in place. The drum, as indicated by dotted lines, may be of any necessary form, may either communicate or receive power, or may be made to carry paper for receiving marks or impressions from a pencil, pen, or marker in a position which will correspond with the longitudinal position of the cone, and therefore corresponding with the velocity at which the paper is moving. The marks may be only a series of rings, or may be curves, according as the cone is moved longitudinally by a persaltum or a gradual movement, and the marks may indicate velocity only or may indicate work. Fig. 5 also shows the cone A as driven or driving, being connected to the shaft S by two keys, E', but four keys may be used. The cylindrical part of a key is fitted in a circular hole, which is half in the part P of the joint and half in the part Q, and is kept in place by pins Y', which pass through the parts P and Q and take into the groove which is shown in the cylindrical part of the keys. Short screw-pins the ends of which project into the groove diametrically may be used instead of the pins Y', which take into the grooves tangentially.

Fig. 6 shows a cone, A, mounted upon a spindle, S, by which it is driven or which it drives, and attached thereto simply by a pin, E', screwed into the spindle and passing through a slot-hole in the smaller part of the cone. This arrangement may be employed in rougher kinds of machinery.

In all the examples so far shown the cone is employed in such a manner that, although it rotates about or upon its axis in the abstract, it has not a real or concrete spindle or axial support in or through its axis at the larger end; but in some cases it may be necessary to mount the cone quite at the end of the shaft or spindle by which it is driven or which it drives, as shown at Fig. 7, in which, however, the keys E', Figs. 1, 2, and 5, are not shown, although some such means of connecting the cone A to the spindle S are needed. In this case the part P of the spherical joint is fixed by any suitable usual key or other means to the end of the shaft S, and the larger end of the cone A is supported by a short spindle, S', in the axis of the cone, provided with a journal to run in a bearing. In some cases the part P might be loose upon the shaft S and transmit motion by means of a drum or pulley attached to P, or by other known means. The spindle S' may also be fixed in the small end of the cone and the ball-and-socket joint made at the large end.

In Figs. 8 and 9, S is a spindle receiving motion from any prime mover or source of rotative motion, and A a cone mounted thereon, with feather and groove. A' is the transmitting-wheel, which may have teeth upon it for tooth-gearing, or sprocket-teeth for chain as at J, or may have a drum or pulley, as indicated by dotted lines J'. Upon the spindle S is fixed a pinion, C, gearing into a pinion or idle-wheel, D, which in turn gears with teeth formed on the interior of the transmission-wheel A', which is loose upon the spindle S. The stud-spindle D', upon which the idle wheel or pinion D rotates, is fixed in the wheel B, which is also loose upon the shaft S. Now, so long as the wheel B is held or prevented from rotating, the wheel A' revolves at a velocity proportionate to the speed of C and the relation between the diameters of C and A'. In order to provide for a variable velocity in A', the wheel B is provided with exterior teeth, which engage with the teeth of the pinion E, which is fixed to the spindle H, carrying the friction-wheel F. So long as F is not in contact with the cone A on the shaft S and is held fast by suitable means, such as a brake, which will be described further on, the velocity of the rotation of A' will remain as above stated; but when the wheel F is placed in contact with the cone-surface it will, through the pinion E, permit the wheel B to revolve at a speed which will be proportional to the relation between the diameter of the part of the cone in contact, the diameter of the wheel F, the pinion E, and wheel B. When F is in contact with the small part of the cone, the wheel B will have the smallest velocity within the variable range, and A' the highest velocity, and correspondingly the wheel B will have the highest and the wheel A' the lowest velocity within that range when the wheel F is in contact with the largest part of the cone. The position of contact between the cone A and wheel F is changed by moving the cone, longitudinally along the spindle S by suitable means, such as a clutch or forked lever engaging with the groove at P'. By means of this gearing the permissive rotation given to the wheel B is not accompanied by any loss of work, as it would be if B were held by a brake and allowed to slip more or less against frictional brake-resistance. The directions of rotation of the pinions C and D and the wheel A' are shown by arrows, Fig. 9, and, as the wheel B acts as a fulcrum for pinion D, it tends to turn in the direction opposite to that indicated by the arrow at A' in Fig. 9, and in this direction it is permitted to rotate at greater or higher velocity by the cone A, wheel F, and pinion E, rotative velocity being correspondingly taken from A'. By making a suitable relation between the diameters of the cone A and the wheel F, the pinion E, and the wheel B the speed given by the larger part of the cone to the wheel F might be sufficient to move the wheel B faster than the wheel A', in which case the apparatus becomes a reversing apparatus, and the wheel A' would rotate in the opposite direction to that shown by the arrow at A', Fig. 9. The drum J' may, as stated, be for power-transmitting purposes, or may be used in small apparatus, as a paper-carrying drum, for velocity and work-recording purposes.

The wheel F in Fig. 8 is shown as of some width on its edge or periphery. Within this width upon the surface of the cone there will be differential velocity proportionate to the difference in the diameter of the cone within the limits of width of the wheel. This detracts from the purely rolling movement of wheel F on the cone; but in practice in most applications it would be a matter of no importance, and in many cases the width of the edge of the wheel would be small. To overcome the slight rubbing friction which would result from this difference of velocity within the area of contact, and to obtain a purely rolling contact when necessary, the disk-wheel F may, as shown in dotted lines at F', be made conical instead of cylindrical and placed upon a spindle inclined to the main spindle, the angles of the cone A and conical wheel F' being the same, so that the velocity ratio within the width of the conical disk and that width on the cone would be equal.

In Figs. 10 to 13 are shown the complete device of the form (partly shown by Fig. 8) for reducing a high velocity to a lower uniform or variable velocity. It is designed for such purposes as receiving at a high speed the power of an electro-dynamic or other high-speed motor and giving off that power at a lower and variable velocity, so that when a high-speed motor is employed—for instance, in propelling a vehicle—the high velocity may be converted into a lower velocity and varied, so as to vary the propelling effort upon the driven wheels, so that, for instance, the motor of the vehicle may run at a uniform speed and the speed of the vehicle be varied in proportion to the resistance to be overcome.

In Figs. 10 to 13 the gearing is an epicycloidal arrangement combined with the cone-gear shown at Fig. 8. The letters S, F, H, E, J, P, and A indicate the same parts as in Fig. 8. The wheels A' and B perform the same functions as in Fig. 8, though working differently. $C^2$ is an eccentric, and $D^2$ is a pinion, which gears with the internal teeth of both wheels A' and B. The number of teeth in the wheels A' and B is not the same, although the pitch diameters must be practically so, the one or other having the greater number, according to the direction it is necessary to rotate A'. Suppose A' to have fifty and B forty-nine internal teeth, then A' will revolve in the direction of the spindle, and assuming this to be as indicated by the arrow at $C^2$ of Fig. 13, then the relations between directions will be as shown by the arrows on wheels $C^2$, $D^2$, and A'. This wheel A' will have precessional rotation with reference to the epicycloidal path of $D^2$, but in the same direction as $C^2$, and the speed of A' will be such that it will be one-fiftieth of one revolution for each time the pinion $D^2$ completes the epicycloidal traverse of its path within wheel B, the rotation of the pinion $D^2$ being in a direction opposite to that of the spindle S.

For the purpose of bringing different parts of the cone A in contact with the wheel F the cone is made movable longitudinally on the spindle S by means of the forked piece Q, attached to one of the vertical portions M' of the slide M, which is moved by the lever R, rod R′, and pin-joint O. As shown in Figs. 10, 11, and 12, that part of the cone A which is opposite the wheel F is recessed, so as to escape the wheel F, and the brake-piece X is pressed in contact with the wheel F by the wedge Y, pushed into its place by the arm Z, which is attached to the slide M. Thus when the lever R is moved toward the opposite side of the quadrant Q′ to that in which it is shown, the wedge Y is pulled from under X. The wheel F is freed from X, but the cone A is brought into contact with it, and F is free to revolve under the influence of the cone. The large end of the cone is shown as supported in a bearing, N, attached to one of the portions M′ of the slide M. The slide M slides upon the rod T, which is held by bearings U and W, and passes through holes in the ends of M, which also slides upon the ends of the set-screws T′, by which the slide is adjusted. The brake-piece X is loosely held by a bolt and nut. The bearings V and V′ of the spindle S may be placed where suitable, and the teeth J may be, as shown, for a pitch-chain for working a tram-car or other purpose, or a pulley or drum, as indicated in dotted lines at J′, may be substituted when the apparatus is used for other purposes or when the device is used for speed-recorders or other instruments; or it may be a gear-wheel.

The wheel F, as shown, is made of a central disk of hard paper-board held between metallic disks bolted together and fixed to the spindle H. Any other suitable friction-wheel may be employed instead of the cylindrical wheel F on spindle H. The conical wheel F′ and spindle H (shown in dotted lines) may be employed as already described with reference to Fig. 8. To adjust the pressure of the contact of the wheel F and the cone A, the bearing H² at the pinion E end of the spindle is made to pivot on a pin, H³, and is set by a screw and lock nut, S², the end of the set-screw touching against the face of the bearing, which is a circular curve struck from H³ as center. At the end F³ the bearing is pressed against by a spring in a hollow indicated by dotted lines at F³, (see Fig. 12,) the pressure upon which is adjusted by the screw and nut S³.

Fig. 14 shows a mode of application of the cone for the purpose of obtaining variable velocity in conjunction with what is known as "compensating" or "Jack-in-the-box" gear, or "Houldsworth's" gear. In this there are four bevel or miter gear-wheels, A², C³, D³, and D⁴. As shown in Fig. 14, it is intended that motion at a variable velocity shall be communicated to the wheel A², which is shown with sprocket-teeth J for a pitch chain, but may communicate its motion by other means. The bevel-wheels or miter-wheels, as shown at D³ D⁴, run upon short spindles, N′, which project from a boss loose upon the shaft S. The outer ends of the spindles N′ are attached to a geared ring, B′. Gearing with the ring B′ is a pinion, E, which is held fast by or allowed to rotate with the spindle H. The spindle H also carries the friction disk-wheel F, which is either held fast by a brake after the manner of that described with reference to Figs. 10 to 13, or is caused to rotate when the cone A is brought against it. When the geared ring B′ is held fast and the bevel-wheel C is rotated with the shaft S, upon which it is fixed, motion is communicated to the wheel A′ through wheels D³ and D⁴, and A² being the same size as C³ it will rotate at the same speed; but if B′ be allowed to rotate in the direction it would move under the influence of C and resistance offered by A², then A² will correspondingly lose velocity. By bringing the cone A in contact with F the ring B′ will thus be allowed to rotate at a velocity corresponding to that of the part of A which is so in contact, and thus a variable velocity will be transmitted to A² after the manner described with reference to Figs. 8 to 13.

In Fig. 15 the fulcrum-wheel F², which corresponds to the fulcrum-wheel B of Fig. 8, is controlled by contact with the cone A and is loose on the driving-shaft S, the cone A being driven by the gearing E³ F×. The power is transmitted by the sprocket-wheel J or equivalent means.

For some purposes the cone A might be mounted by means of a form of gimbal or a "hook's" joint; but the spherical joint is the preferable one.

Having now described my apparatus for varying the velocity of rotating mechanism and explained the manner in which it may be variously carried into effect, I would have it understood that I do not confine the application of my invention to any particular kinds of machinery or apparatus or to those only that are mentioned, as the invention has very numerous applications—such as controlling the speed of steam-engines and other machines and in cotton-spinning and other machinery; and I would also observe that I do not claim as my invention, except in the combinations described, the epicycloidal gear explained with reference to Figs. 10 to 13, nor the internal epicyclic gear described with reference to Figs. 8 and 9, nor the bevel-wheel gear described with reference to Fig. 14; but

What I do claim as my invention is—

1. In apparatus for varying the velocity of rotating mechanism, the cone A, in combination with a rotating spindle, S, which is mounted about parallel with one side of the cone, and is attached to the small end of the cone by a flexible joint, a bearing for supporting the larger end of the cone, a motion-transmitting appliance in frictional contact with the side of the cone, and means, as described, for altering the relative position of the cone A and the motion-transmitting appliance, substantially as set forth.

2. The cone A, supported as described, in combination with a rotating spindle, S, which is mounted about parallel with one side of the cone and is attached to the small end of the cone by a flexible joint, a wheel, F, on a spindle, H, which also carries a pinion, E, epicyclic toothed wheels gearing with said pinion, and means, substantially as described, for altering the relative position of the cone A and the wheel F, substantially as and for the purposes set forth.

3. The cone A, supported as described, in combination with a rotating spindle, S, to which its small end is connected by ball-and-socket joint P Q, and key E', the friction-wheel F, and a lever for altering the relative position of the cone A and the wheel F, substantially as set forth.

4. A cone, A, in combination with a rotatable spindle, S, to which the small end of said cone is connected by a ball-and-socket joint, P Q, keys E', pins Y', passing through said parts P Q, for securing the keys in place, and a roller, G, on the spindle S, for supporting the large end of the cone A, substantially as set forth.

5. The cone A, supported as described, in combination with a rotating spindle, S, to which the small end of the cone is connected in the manner described, an eccentric, $C^2$, on the spindle S, a spur-wheel, $D^2$, which works thereon, epicycloidal toothed wheels A' and B, which gear with the spur-wheel $D^2$, a pinion, E, which gears with the toothed wheel B, and which is fixed on a spindle, H, whereon is also fixed a friction-wheel, F, adapted to work in contact with the cone A, a lever, R, a brake, X, for the wheel F, and connections between the latter and the cone A for shifting the latter relatively to the wheel F, substantially as set forth.

WILLIAM WORBY BEAUMONT.

Witnesses:
DAVID McGAW,
77 *Chancery Lane, London.*
WALTER J. SKERTEN.